Patented July 4, 1939

2,164,367

UNITED STATES PATENT OFFICE 2,164,367

HIGH TEMPERATURE REACTION PRODUCTS

Herbert A. Winkelmann and Eugene W. Moffett, Chicago, and William C. Calvert, Oak Park, Ill., assignors to Marbon Corporation, a corporation of Delaware No Drawing. Application May 27, 1936, Serial No. 82,158

8 Claims. (Cl. 260—111)

This invention relates to addition products of rubber and hydrogen halides. More particularly it relates to oil, water and solvent resistant rubber-hydrogen chloride addition products and to articles of manufacture made from them. The preferred articles of manufacture are heat and pressure flowed solid shaped masses such as are obtained by milling, calendering, tubing and molding.

Addition products of rubber and hydrogen halides such as rubber hydrochlorides may exist in various forms and conditions. The rubber hydrochlorides may not only be partially or fully saturated but the partially or fully saturated rubber hydrochlorides may exist in different states; for example amorphous and crystalline, symmetrical and asymmetrical. Furthermore, polymerization, cyclization, decomposition and readdition as well as ordinary addition may take place during the reaction. The types of rubber hydrochlorides and their resultant properties vary with the method of preparation. Rubber hydrochloride may be made by reacting either solid or dissolved rubber with gaseous, liquefied or dissolved hydrogen chloride at various temperatures and pressures. Furthermore, the temperature at which the reaction of rubber, whether dissolved or undissolved, and hydrogen chloride takes place has a great deal to do with the properties of the resulting rubber hydrochlorides.

Hitherto the various differences in rubber hydrochlorides, outside the general differences due to partial or complete saturation, have not been recognized. Rubber hydrochloride has only found extended use in the casting of films from solutions, and the coating of various materials with solutions. For such purposes a relatively soluble rubber hydrochloride must necessarily be used.

The use of insoluble, oil resistant rubber hydrochlorides in the production of oil resistant, molded, calendered or formed articles of manufacture has not been done in spite the many attempts to find commercially practical oil resistant substitutes for rubber. Although many substitutes have been developed, among the most important being polymerized chloroprene (Duprene), and ethylene dichloride-sodium polysulphide condensation products (Thiokol), all of the substitutes possess certain disadvantages, which at least in part are overcome in the oil resistant rubber hydrochloride compositions of this invention.

It is, therefore, an object of this invention to provide an insoluble, oil and water resistant type of rubber hydrochloride, which can be used in place of, or in conjunction with other oil resistant products such as, for example, polymerized chloroprene.

Another object is to provide a composition containing rubber hydrochloride which is resistant to ordinary rubber solvents, oils and the like, which can be molded, calendered, formed and vulcanized without substantial recomposition in a manner similar to rubber.

Another object is to provide new oil resistant molded products having the tough and strong characteristics of hard rubber.

A further object is the production of heat and pressure flowed articles of manufacture such as packing, gaskets, gasoline feed lines, flexible hose, floors, insulation for ignition wires and other articles which must stand up better than rubber under the action of lubricating and other oils, gasoline, ultraviolet light, chemicals such as bleaching solutions, acids, salt solutions, ozone and the like.

Another object is the attaining of an oil resistant, soft vulcanized rubber hydrochloride composition, and articles of manufacture.

Other objects will become apparent on reading the specification.

The main product of this invention hereinafter designated as insoluble type rubber hydrochloride, is a substantially saturated addition product of rubber and hydrogen chloride characterized by having a high softening point, great flexibility, and a distinct and sharp crystalline X-ray pattern, and by having low oil, gasoline and water absorption. For example, the preferred product has an oil absorption in an 80-20 gasoline-benzol mixture for 48 hours at room temperature of less than 1% increase in volume without disintegration four hours after removal from the liquid, and a resistance to solvents, as determined by heating the product in benzol at 78° C. for one hour, of at least 10% residue and preferably above 40% residue and in cold benzol of at least 80% residue. Although this product has little value in solutions since it is only soluble in benzol to the order of 1%, it may be directly subjected to heat and pressure and flowed into various useful articles of manufacture particularly adapted for uses where oil and solvent resistance is desired. The product is also particularly adapted for vulcanization and gives vulcanizates of particularly high tensile strength and good oil resistance.

The main product of this invention, insoluble type rubber hydrochloride, may be made by reacting a solid mass of rubber with gaseous hydrogen chloride at a pressure and for a length of time sufficient to substantially saturate the double bonds of the rubber mass substantially completely and uniformly throughout its mass including the inside portion or core, and carrying out the process for a major part of the reaction at a temperature substantially above room temperature as, for example 110° C., but below the temperature at which substantial decomposition of the addition product takes place. The raw product may be changed in apparent density and made into various articles of manufacture by subjecting it either alone or with fillers, plasticizers or heat stabilizers to heat and pressure sufficient to flow the material into shape, but with insufficient heat to substantially decompose the product. Where articles of manufacture of the greatest oil resistance are desired the fillers, plasticizers or heat stabilizers should either be used in a minimum quantity or should be themselves of high resistance to oils and solvents. Plasticizers, in the present invention are preferred when they are resistant to solvents and oils. Milling, molding and tubing of the insoluble type rubber hydrochloride is preferably carried out at high pressures and at elevated temperatures sufficient to flow or flux the product. The use of heat stabilizers such as magnesium oxide and PbO is of great value in the production of heat and pressure flowed articles of manufacture.

The pressure, temperature, time of reaction, mass, thickness, porosity and purity of the rubber are all important factors in making insoluble, oil and water resistant, strong rubber hydrochloride compositions of this invention.

Temperature

Probably the most important single factor is the temperature of the mass during reaction. There appears to be an entire series of rubber hydrochlorides whose characteristics vary depending on the temperature at which the products are produced. In general, the higher the mass temperature up to the decomposition temperature of the rubber hydrochloride, the better is the product from the point of view of insolubility in aromatic hydrocarbons, the less the swelling in oils, gasoline, and the like, the higher the softening point, and the greater the flexibility. In the case of benzol solubility there appears to be a critical point of about 115° above which the solubility of the rubber hydrochloride suddenly decreases until the decomposition temperature is attained. There, however, appears to be some improvement in products made in the range of from 30° C. to 115° C. over those made at below 30° C. from the point of view of benzol solubility and also oil resistance. The preferred reaction temperature range for insolubility is 120° to 140° C. Products made in this temperature range have residues in boiling benzol of from 40 to 70% and higher. However, for optimum results, taking into consideration not only residue, but resistance to oils, flow point and ease of milling, the preferred temperature is about 105° to 120° C.; the lower limit shading off to about 85° C., and the upper to around 125° C. These temperatures are based on the observed temperatures in rubber of .02" thickness, and are believed to be very close to true temperatures.

The following table illustrates the effect of mass temperature throughout the major part of the reaction on the solubility of the resulting rubber hydrogen chloride reaction products made from .02" thick smoked sheets of 400 plasticity, reacted in the solid state with dry gaseous hydrogen chloride to substantial saturation. The solubility is measured by the amount of unextracted matter remaining after extraction of the solid, granulated product with benzol at 78° C. for one hour, and benzol at 25° C. for four days.

TABLE I

| Temperature | Hot benzol | Cold benzol |
|---|---|---|
| Major part of reaction: | | |
| −85° C.+1 | 1.5 | 6.0 |
| +15° C.±10 | 2.9 | 98 |
| +70° C.±5 | 22.0 | 99 |
| 120° C.±5 | 42% | 99 |
| 130° C.±5 | 52% | 99 |
| 140° C.±5 | 56% | 99 |

Temperature control

The reaction of rubber and hydrogen chloride is highly exothermic and takes place with great rapidity and almost explosive violence, particularly during the initial stages of the reaction. Increase in temperature and increase in concentration of the hydrogen chloride accelerates the reaction. With solid rubber and dry gaseous hydrogen chloride the temperatures produced within the mass of rubber and rubber hydrochloride are extremely difficult to control due in part to the high insulating properties of the mass, the tendency of the hot gases to segregate in the top portions and interiors of the reactor. For example, spaced sheets of porous rubber of 50 pounds mass when subjected to hydrogen chloride gas under 300 lbs. per sq. in. pressure will react so violently that the temperature of the mass will rise to 165° C. and over within fifteen minutes. This temperature is so high that fusion and substantial decomposition of the reaction product takes place. Although hydrogen chloride will re-add to the decomposed and fused product we have found that it is extremely difficult to cause this re-addition to take place, particularly where the masses have fused together, and furthermore the re-added product when obtained is inferior in oil resistance and strength to products which have been made without any intervening decomposition and fusion. It is, therefore, very important to provide means for maintaining the temperatures in the mass during the reaction at below decomposition and fusion temperatures, as well as to maintain the temperature within temperature ranges which will produce products of the optimum qualities. Because of the highly exothermic reaction this is by no means a simple matter, and the failure to accomplish control of temperature and the lack of realization of the necessity of control as hitherto impaired the commercial utilization of the solid rubber and dry gaseous hydrogen chloride reactions. We have discovered several methods of controlling the temperature of these reactions. The reaction is carried out with spaced thin sheet rubber. In general, the best rate of admission of gas and the gas pressure or gas concentration should be determined for a given mass which will maintain the temperature or temperature range necessary to prevent fusion and decomposition and to give the product desired. For the production of the preferred insoluble type products this temperature will be within, for example, 105° to 140° C.; for other types of products other temperature ranges may be chosen and obtained by the pressure control means or by other means. Temperature control is not only of importance in the production of various types of products, but is also of importance in obtaining uniform products of the same general type. In order to obtain uniform products it is necessary that the temperature throughout the reaction and the temperatures throughout different parts of the mass in the reactor be kept within narrow limits. The pressure control means of temperature regulation is not particularly efficient in maintaining temperatures constant throughout different parts of the reactor. For this and other reasons temperature regulation by means of circulation of hydrogen chloride gas is preferred. Hydrogen chloride gas is flowed at a high velocity through the reactor between divided masses of solid sheet rubber. In this way the flowing gas prevents gas pockets and causes the temperature throughout the reactor and mass of rubber to remain substantially uniform or constant. Any sudden production of heat such as may take place during the initial stages of the reaction will be efficiently removed by the flowing gas passing in contact with the rubber mass. The gas may be then cooled and recirculated if desired. When necessary, as for example with large masses of rubber, the entrance gas may be admitted at a low temperature or at a high rate to take care of high rate of heat evolution during the reaction. On the other hand the gas may be admitted at elevated temperatures when the temperatures of the mass during the reaction becomes too low for the production of the desired product. It is seen, therefore, that the regulation of the velocity and temperature of hydrogen chloride gas between divided masses of rubber is a useful means for controlling reaction temperatures and consequently controlling the type and uniformity of the reaction product.

Pressures

The pressures may be varied widely. It is, however, important that the pressure of hydrogen chloride in contact with the rubber hydrochloride mass be maintained above the dissociation pressure of the substantially saturated rubber hydrochloride at whatever is the temperature of the rubber hydrochloride mass during and after reaction. It is also important that the pressure be sufficiently high so that the gas will penetrate through the first formed rubber hydrochloride outer layers into the center of the mass in a short time. A pressure of above 50 pounds, and preferably above 150 pounds, is advisable.

Time of reaction

The mass should be largely reacted to a substantially saturated addition product of rubber and hydrogen chloride during the period in which the temperature is above +90° C., preferably between 115° C. and 140° C. For a twenty pound mass and sheets of .02" thickness and pressure of about 250 pounds, the major part of the reaction seems to take place within fifteen minutes but in order to have substantial completion of the reaction the product is exposed to the action of the hydrogen chloride for about two hours. Where the rubber mass is thick and non-porous the time may be much longer. However, long exposure of unreacted rubber and of rubber hydrochloride at high temperature is inadvisable. The reaction should be carried out with thin or porous rubber in as short a time as possible to obtain the desired insoluble saturated product. The time of contact at temperatures around 100° C. should preferably be less than four hours.

Thickness of rubber

The thickness of the rubber is also important. When the rubber is too thick the conduction of heat from the inside portion or core of the mass is so slow that the temperature rises to such a degree that fusion and decomposition take place. The rubber, therefore, should be as porous and as thin as possible, and the rate of gas flow over the rubber should be as fast as possible. It has been found that for the production of oil resistant and benzol resistant products the thickness should not be over approximately ¼ inch for the unmilled crepe rubber. Preferably thin sheets of .02" thickness are used for all types of rubber, this dimension being about the commercially practical limit of thinness. The use of powdered rubber in place of thin sheet rubber, however, gives a violent reaction, which is almost impossible to control.

Type of rubber

The rubber should preferably be of low degree of plasticity. Unmilled pale crepe, as it comes from the plantation, gives a superior oil and water resistant rubber hydrochloride composition than ordinary milled rubber, and due to its high porosity is of particular advantage in promoting uniformity and speed of reaction. Dried latex is operable. Regenerated rubber (reclaim) gives a rubber hydrochloride of extreme insolubility. Rubber in which the proteins and sugars have been removed gives a rubber hydrochloride of lighter coloration since charring is diminished.

Additions to rubber

Various materials may be added to the rubber prior to reaction with hydrogen chloride. In many cases only a small proportion of ingredients will greatly affect the characteristics of the resulting rubber hydrochloride. Small proportions of about 1% or less of inorganic salts such as ferric chloride, antimony chloride, aluminum chloride, and zinc chloride added to the rubber before reaction with hydrogen chloride greatly decreases the solubility of the resulting product. Some organic materials have a like effect, as for example sugar, resorcinol, pyrogallol. These materials, although improving the apparent insolubility of the product seem to have little effect on the resistance of the products to swelling in oils, gasoline and the like. However, other materials such as pine tar and cumar seem to increase the solubility of the products in benzol while improving or at least not harming the resistance of the rubber hydrochloride product in oils and the like. Moreover, pine tar, cumar, mineral oils and other softeners aid in the milling of the product and are desirable for that reason. Rosin, ester gums, opal wax also act as homogenizing agents during milling and are otherwise useful. From the point of view of low absorption in oil, gasoline and water, combined with good milling characteristics the addition of rosin, ester gum, pine tar, cumar is of advantage and gives a preferred commercial product. Reaction temperatures of 220° F. to 250° F. on .02" smoked sheet of 400 plasticity, containing 5–10 parts cumar, gave the lowest gasoline-benzol absorption. As a lower limit 206° F. was not far out of line. Above 250° F. oil absorptions immediately after removal were over 5%. With rosin the smallest volume changes were obtained on products reacted at 184° F. and 250° F. from .02" rubber. Intermediate temperatures of preparation gave volume shrinkage both immediately and after four hours recovery.

Solvents

The insoluble type rubber hydrochloride may be made with rubber containing solvents. The solvents tend to aid the penetration of the hydrogen chloride into the mass and to give a more uniform reaction, but have the disadvantage that they tend to disaggregate the rubber. Benzol in a proportion of 25% or less on a 20 lbs. mass does not appreciably retard the formation of insoluble type products. However, with larger amounts of liquids, particularly with small masses, there is a tendency for the heat of the reaction to be dissipated so that the preferred temperatures of +105° to 130° C. cannot be reached or maintained long enough. With large masses of rubber the amount of solvent, plasticizer etc. may be much more than 25%. The presence of liquids which will vaporize during the course of the reaction is of aid in preventing excessive temperatures in the mass. Benzol, ethylene dichloride, ethyl acetate and other liquids are suitable. In general the solvents should not be used in such large amounts as to produce a rubber solution or sol, and preferably the amount of disaggregation of the rubber by solvents or other means should be kept low.

The product of this invention (insoluble type rubber hydrochloride) is characterized by a higher softening point and by a sharper defined crystalline X-ray pattern over other rubber hydrochloride compositions and by being more insoluble and more oil and water resistant than products made by passing hydrogen chloride into solutions of rubber or products made by subjecting undissolved rubber to gaseous hydrogen chloride at low temperature. One of the distinguishing features of the rubber hydrochloride of this invention is its extremely low and often negative swelling in oils, benzol-gasoline mixtures. Another feature is the high chlorine content. In general, the chlorine content is above 30% chlorine for the preferred tough, flexible, insoluble product. Chlorine contents of 32% to 33.5% on the basis of the rubber are usual.

The following table illustrates the difference in solubility of products made by various methods:

TABLE II

| Sample | Percent residue | |
|---|---|---|
| | Hot benzol at 78° C. | Cold benzol at 20° C. |
| 1 Milled pale crepe sheet of .02" and mass of 50 lbs. directly reacted with gaseous hydrogen chloride for eight hours at 150 lbs. per sq. in. pressure, chlorine content 31%, temperature 100-130° C. | 57.0 | 97.8 |
| 2 Milled smoked sheet of .02" thickness with 1% iron chloride directly reacted with gaseous hydrogen chloride for 2 hours at 300 lbs. per sq. in. pressure. Chlorine content approximately 31%. Temperature 100°-130° C. | 88.7 | 91.7 |
| 3 Dutch Estate crepe substantially unmilled and of .02" thickness spaced with nickel wire directly reacted with gaseous hydrogen chloride slowly admitted for three hours with increasing pressure up to 300 lbs. per sq. in. Temperature variation throughout major part of reaction from 100 to 130° C. Chlorine content 31%. | 61 | 99.0 |
| 4 Rubber in solution partially reacted with gaseous hydrogen chloride in accordance with Calvert Patent #1,989,632. Temperature of reaction 20° C. | 2.2 | 96.0 |
| 5 Rubber in solution substantially completely reacted with gaseous hydrogen chloride in accordance with Bradley and McGavack Patent #1,519,659. Temperature range of reaction 20° C. | 1.9 | 99.0 |
| 6 Rubber of about 1/16" thickness reacted with a saturated solution of hydrogen chloride in ethyl acetate at room temperature of 20° C. and atmospheric pressure. Chlorine content 31%. | 1.8 | 98.0 |
| 7 Pale crepe sheets directly reacted with liquefied hydrogen chloride at −85° C. | 1.5 | 6.0 |

In the above samples the hot extractions were run one hour. The cold extractions were agitated in a shaking machine for four days.

The above table shows the desirability from the point of view of obtaining insoluble products, of using solid rubber, of reacting at high mass temperatures and of using substantially unmilled rubber.

The following Table III shows the effect of various kinds and amounts of salts in the rubber on the chlorine content, solubility and oil absorption of the rubber hydrochloride composition. The rubber in the form of sheets of .02" milled smoked sheet in each case was subjected directly to hydrogen chloride for two hours at 300 lbs. per sq. in. pressure. The insolubility of the product is expressed in percent residue remaining after boiling with benzol for one hour.

TABLE III

| Catalyst | Per cent | Max. temp. reaction 0° C. | Per cent $Cl_2$ | Per cent residue | Oil absorption, percent increase volume immediately after removal |
|---|---|---|---|---|---|
| Blank | 0 | 95±20 | 32.1 | 12.9 | |
| $FeCl_3$ | 0.1 | 95±20 | 31.8 | 18.9 | 1.8 |
| $FeCl_3$ | .25 | 95±20 | 32 | 33.8 | 15.4 |
| $FeCl_3$ | .5 | 95±20 | 32.4 | 34.4 | 9.8 |
| $FeCl_3$ | 1.0 | 110±20 | 30.7 | 88.4 | 72.2 |
| $FeCl_3$ | 5.0 | 110±20 | 23.1 | 72.6 | |
| $AlCl_3$ | 1.0 | 110±20 | 29.9 | 67.6 | 16.3 |
| $AlCl_3$ | 5.0 | 110±20 | 30.6 | 71.8 | 30.7 |
| $ZnCl_2$ | 0.1 | 95±20 | 32.5 | 14.4 | 6.9 |
| $ZnCl_2$ | .25 | 95±20 | 32 | 16.6 | 15.7 |
| $ZnCl_2$ | .5 | 95±20 | 31.7 | 13.3 | 9.1 |
| $ZnCl_2$ | 1.0 | 110±20 | 30.1 | 50.4 | 17.0 |
| $ZnCl_2$ | 5.0 | 110±20 | 31.3 | 62.5 | 182 |
| $SbCl_3$ | 0.1 | 95±20 | 30.9 | 13.7 | |
| $SbCl_3$ | .25 | 95±20 | 31.6 | 15.3 | 3.9 |
| $SbCl_3$ | .5 | 95±20 | 32.5 | 18.3 | 7.5 |
| $SbCl_3$ | 1.0 | 110±20 | 31.4 | 28.9 | 17.4 |
| $SbCl_3$ | 5.0 | 110±20 | 30.8 | 15 | Disintegrated |

The following table gives the comparative oil absorptions in 80—20 gasoline-benzol mixture for 48 hours at 20° C. for A, one of the applicants preferred insoluble type rubber hydrochloride compositions; B, a substantially saturated solution type of rubber hydrochloride made according to Bradley & McGavack Patent #1,519,659; C, a soluble type amorphous rubber hydrochloride made with solid rubber and liquefied hydrogen chloride at −85° C.

TABLE IV

Oil absorption on molded plates at room temperature

| | Immediately after removal, percent increase | | 4 hours after removal, percent increase | |
|---|---|---|---|---|
| | Weight | Volume | Weight | Volume |
| A (Marbon) | 3.1 | 1.2 | 2.5 | −4.0 |
| B (Bradley) | 7.1 | 11 | 5.6 | 7.4 |
| C (Gebauer) | 51.4 | 63 | 25 | 31 |

The rubber hydrochloride compositions of the above table were all stabilized by the addition of 10% magnesium oxide, and 10% lead oxide prior to molding and testing so that they would retain their characteristics throughout the heat of milling and molding.

The following table shows the difference in plasticity between rubber hydrochloride obtained by reacting solid rubber with liquefied hydrogen chloride at 85° C. (amorphous R-HCl) and rubber hydrochloride obtained by reacting solid rubber with dry gaseous hydrogen chloride at about 110° C. (Marbon). For this work the regular Williams plastometer was used, the molded buttons being given a fifteen minute warm up, three minutes in the press (5 kg. weight) and one minute recovery. Thirty parts of magnesium oxide and two parts of hexamethylene tetramine per 100 parts of rubber hydrochloride by weight were used to obtain heat stability. The plasticity is in thickness in m. m. after applying the 5 kilogram weight, the lower the figure the softer the product.

TABLE V

|  | Temperature, ° C. | Plasticity |
|---|---|---|
| Amorphous R–HCl | 50 | 541 |
|  | 65 | 430 |
| Marbon R–CHl | 80 | 334 |
|  | 95 | 636 |

The preferred product (Marbon) of this invention is made by subjecting a substantially solid 20 pound mass of (400 plasticity) smoked sheet of about .02" thickness directly to dry hydrogen chloride gas for two hours under a pressure of about 300 lbs. per sq. in. and controlled temperature. The gas is preferably contacted with the rubber sheets rolled into bundles and spaced apart by means of nickel wire. The mass is preheated to about 55° C. and the temperature controlled so that throughout the major part of the reaction the temperature of the mass remains at 105–120° C. After about two hours the mass is in a substantially completely reacted state, and is the raw product (Marbon) of this invention. The excess hydrogen chloride is removed by evacuation and the Marbon washed. The Marbon product is placed on the rolls of a rubber mill, and a mixture of magnesium oxide, lead oxide and cumar in a proportion of 10 parts by weight of each per 100 parts of rubber hydrochloride added during milling. The mixture is flowed by the heat and pressure of the rolls into a homogeneous integral mass. Preferably the rolls are warmed with steam. The mass is then calendered into sheets. The sheets are cut into smaller sheets and molded by heat and pressure into any desired shape. A temperature of 268° F. for twelve minutes at 2000 pounds pressure is satisfactory to producing flowing of the solid Marbon and a resulting dense and homogeneous product. Molded blocks of, for example 6" x 6" x 1/16" may be made. Tests on these show a tensile strength of 3400–3900 lbs. per sq. in., elongation of 10–40%, and hardness of 2–4 as determined by the Pusey & Jones penetrometer. The dielectric strength and electrical resistance is high. The product is also highly resistant to ozone. Its resistance to solvents, oils and water is good as shown by Tables VI and VII. The oil absorptions are obtained by immersing the molded compositions in 80—20 gasoline-benzol mixture for 48 hours at room temperature. The solubilities are determined by heating the composition in boiling benzol for one hour and weighing the residue. The oil absorption of this product and solubility range as follows:

TABLE VI

| Cl² | Percent insolubility | Oil absorption immediately after removal, percent increase | | Oil absorption 4 hours after removal, percent increase | |
|---|---|---|---|---|---|
|  |  | Weight | Volume | Weight | Volume |
| 32.6 | 50.0 | 7.1 | 2.0 | 4.7 | –2.0 |

The water absorption on the preferred composition ranges as follows:

TABLE VII

Water absorption

| Cl² | 24 hours, percent increase | | 7 days, percent increase | |
|---|---|---|---|---|
|  | Weight | Volume | Weight | Volume |
| 32.6 | .57 | 0 | 1.6 | 0 |

The compositions of the invention may be formed into various articles of manufacture. Composition of 100 parts insoluble type oil resistant rubber hydrochloride composition milled with 10 parts MgO, 10 parts PbO and 10 parts wood rosin result in a composition which may be milled, molded and calendered while retaining its high tensile strength, low elongation, insolubility, and oil resistance.

Packing rings, gaskets, tubes for gasoline feed lines, dielectrics, insulators and many other articles of manufacture may be produced from the oil resistant products of the invention, and particularly from the modified heat stabilized oil resistant product.

By heating the stabilized rubber hydrochloride with sulfur and rubber accelerators the material may be cured so as to bring about a vulcanization as described in the copending application, Serial No. 22,431, filed May 20, 1935. The curing of the rubber hydrochloride compositions removes thermoplasticity and gives softness, improved flexibility and elasticity with good tensile strength. Such cured products have many uses as, for example, printers rolls and blankets, gaskets and tubes.

The addition of rosin in rubber hydrochloride compositions is not essential but is of aid in obtaining a homogeneous mixture on milling and also gives a harder and more water resistant product. Other resins may be used such as, for example, shellac, cumarone-indene resin, vinyl acetate resins, glyceryl phthalic anhydride resins and phenol-formaldehyde, maleic acid-rosin or ester gum resins.

Magnesium oxide is the best of the heat stabilizers, and may be used with good results even as low as five parts by weight per 100 parts of rubber hydrochloride. Litharge is a heat stabilizer by itself, although its use with magnesium carbonate, calcium oxide and disodium phosphate may be used. Hexamethylene tetramine is also of some value in stabilizing rubber hydrochloride against decomposition by heat and milling, but gives the best results when used in conjunction with magnesium oxide. The copending application, Serial No. 11,665, describes many other materials having stabilizing action, and which may be used with the improved insoluble type, oil resistant rubber hydrochloride.

Plasticizers such as butyl stearate, amyl benzene, tertiary amyl amine, benzyl ether, chlorinated paraffin, cumarone resins (Cumar) may be incorporated in the insoluble type rubber hydrochloride by milling or otherwise. Insoluble, oil resistant and water resistant plasticizers such as condensation products of polyhydric alcohols and polybasic acids such as unmodified glycerinephthalic anhydride are preferred. Diols such as duodecadiol are useful as oil and solvent resistant plasticizers.

Fillers such as carbon blacks, wood flour, cork, asbestos, cotton flock, blanc fixe, rayox, and the like may be used. Wood flour is of particular use with rubber hydrochloride since it does not cause any substantial decrease in tensile strength, and gives low oil absorption. The binding power of insoluble type rubber hydrochloride (Marbon) is so high that mixtures of 500 parts filler such as blanc fixe to 100 parts of Marbon may be molded into strong homogeneous products.

Various oil resistant products such as rubber substitutes may be mixed with oil resistant rubber hydrochloride, the rubber hydrochloride improving the strength and milling qualities of the other materials. Among these rubber substitutes are the reaction products of benzene with ethylene dihalide such as are described in Patent No. 2,016,026, the reaction products of sodium polysulphides and ethylene dihalides such as Thiokol, and materials of the factice type such as oxidized drying oils, vulcanized drying oils and the like.

The various compositions may contain the uncured insoluble type rubber hydrochloride or the vulcanized or cured insoluble type rubber hydrochloride.

The following table shows a comparison of the vulcanized and unvulcanized, insoluble type oil resistant rubber hydrochloride composition of this invention (Marbon), pigmented with Gastex, fillers and the like. The materials were compounded by milling on a regulation rubber mill and molding into blocks for a time and temperature as designated. The products obtained by molding 3 minutes at 240° F. are substantially unvulcanized, the others which are cured for 60 minutes are vulcanized.

TABLE VIII

| | | |
|---|---|---|
| Marbon | 100 | 100 |
| Gastex | 52 | 40 |
| MgO | 23 | 10 |
| PbO | 23 | 10 |
| Soft Cumar | 16.6 | 10 |
| Sulfur | 9.1 | 7 |
| Butyr-aldehyde-aniline | 6.5 | 5 |

| Time | Temp. °C. | Vulcanized | | | Unvulcanized | | |
|---|---|---|---|---|---|---|---|
| | | Tens. | Elong. | Set | Tens. | Elong. | Set |
| 3" x | 240 | 2843 | 10 | ----- | 2560 | 10 | ----- |
| 60" x | 288 | 1307 | 257 | 30 | 1093 | 480 | 30 |

Tensile strength after 48 hours immersion in benzol-gasoline mixture. Tested 4 hours after removal

| Time | Temp. °F. | Vulcanized | | | Unvulcanized | | |
|---|---|---|---|---|---|---|---|
| | | Tens. | Elong. | Set | Tens. | Elong. | Set |
| 3" x | 240 | 1213 | 10 | ----- | 2123 | 30 | 3 |
| 60" x | 288 | 985 | 315 | 26 | 440 | 260 | 17 |

Oil absorption benzol-gasoline mixture, 48 hours room temperature immediately after removal

| | | Percent inc. wt. | Percent inc. vol. | Percent inc. wt. | Percent inc. vol. |
|---|---|---|---|---|---|
| 3" x | 240 | 1.12 | 25. | 5.27 | 13.47 |
| 60" x | 288 | 27. | 85. | 52.8 | 95.9 |

4 hours after removal

| | | | | | |
|---|---|---|---|---|---|
| 3" x | 240 | 5.96 | 0 | 1.0 | 0 |
| 60" x | 288 | 6.86 | 20 | 15.3 | 18.75 |

Water absorption—room temperature—24 hours

| | | Percent inc. wt. | Percent inc. vol. | Percent inc. wt. | Percent inc. vol. |
|---|---|---|---|---|---|
| 3" x | 240 | 1.54 | 8 | 1.27 | 2 |
| 60" x | 288 | 9.5 | 17.79 | 6.9 | 8.7 |

7 days

| | | | | | |
|---|---|---|---|---|---|
| 3" x | 240 | 4.44 | 14.0 | 3.17 | 2.00 |
| 60" x | 288 | 33.89 | 62.2 | ----- | ----- |

It is apparent from the above that the oil and water resistance of the product of this invention (Marbon) decreases on vulcanization but still remains high, and much better than vulcanized rubber. The lessening of the amount of filler such as gastex and the increase in the proportion of litharge gives improved tensile and oil resistance, tensiles of 3400 lbs. and oil absorption of 46% by volume immediately after removal having been obtained on vulcanized products made by our improved formulae.

One of the most important auxiliary ingredients for the insoluble type rubber hydrochloride is polymerized chloroprene. This may be milled with the rubber hydrochloride preferably in the presence of magnesium oxide, or may be admixed according to the procedure as given in the following example:

50 parts of crude rubber and 50 parts of polymerized chloroprene are milled to a homogeneous integral mass of about .02" thickness, and exposed directly to the action of gaseous hydrogen chloride under approximately 300 lbs. per sq. in. pressure at 110° F. for four hours. A product is obtained consisting essentially of substantially completely reacted insoluble type rubber hydrochloride and substantially unreacted polymerized chloroprene. This product may be milled with magnesium oxide, or other stabilizer and molded or calendered. The product has very good resistance to water, oils and rubber solvents, and finds similar use to straight polymerized chloroprene. It may be vulcanized as heretofore stated.

It is to be understood that numerous details of this invention may be varied through a wide range without departing from the spirit of the invention. Other hydrohalogens may be used by varying the conditions than hydrogen chloride, as for example hydrogen bromide.

The thermoplastic rubber hydrochloride compositions of this invention are of particular advantage for molding and other uses, requiring thermoplasticity in which low melting rubber substitutes such as polymerized chloroprene are at a disadvantage. The fact that the rubber hydrochloride compositions of this invention need not be vulcanized prior to being manufactured into oil resistant articles is another advantage over other rubber substitutes. The unvulcanized rubber hydrochlorides of this invention have the toughness and strength of hard rubber without the low oil resistance of hard rubber. However, the vulcanization of the rubber hydrochloride compositions of this invention gives products similar to ordinary vulcanized rubber in resilience and strength, but with superior resistance to lubricating oils and gasoline, thereby combining the softness, flexibility, tensile strength and low cost of vulcanized rubber with the oilproof qualities of rubber substitutes.

Although it is preferred to carry out the reaction without decomposition of the rubber hydrochloride, it is better to carry out the reaction to completion and at elevated temperatures and allow some decomposition than to incompletely react the rubber or react at too low temperature. It is also possible by this invention to react the rubber with a mixture of halogen and hydrogen halides or successively halogenate and hydrohalogenate. However, the addition or substitution of halogen in the rubber or rubber hydrochloride molecule results in an increase in solubility and a lessening of its resistance to oils so that the use of halogen should be minimized or entirely eliminated.

It is also within the bounds of this invention to react rubber with aqueous hydrogen chloride at elevated temperatures of above 90° C. and particularly to react solid rubber with aqueous hydrogen chloride under superatmospheric hydrogen chloride gas pressure at elevated temperature, as for example 120° C., to produce oil and solvent resistant products. It is, however, preferred to carry out the reaction at elevated temperatures with substantially dry gaseous hydrogen chloride since with dry gas, products of superior resistance to water, oils and solvents are more readily attained. It is also believed that the dehydrating action of dry hydrogen chloride resulting in carbonization or charring of the proteins and sugar in natural rubber is an important factor in giving improved water resistance. It is believed also that the presence of the extremely finely divided carbon aids in the insolubility of the resulting product in benzol. An important aspect of our invention is, therefore, the reacting of rubber containing proteins and sugars with hydrogen chloride under substantially anhydrous conditions at a temperature above the charring temperature of the composition and below the decomposition temperature of the rubber hydrochloride. Charring definitely takes place at 90° C., the lower limit shading off to about 85° C., or slightly lower.

The following examples will serve to illustrate the methods which may be employed for the formation of articles of manufacture from the unvulcanized oil and solvent resistant high temperature rubber-hydrogen chloride reaction product and by vulcanizing the oil and solvent resistant high temperature rubber-hydrogen chloride product. In general, as in rubber the unvulcanized product is shaped into form and the product then, if desired, cured or vulcanized into a relatively non-thermoplastic state. It will be obvious from the examples that the unvulcanized high temperature rubber-hydrogen chloride reaction product is generally adapted for use wherever plastic or resinous materials are used, giving many products having advantageous properties lacking in other plastic or resinous materials, while the vulcanized high temperature reaction product is adapted for use as a general substitute for rubber or polymerized chloroprene. In view of the enormous scope of the plastic and resinous products field, it will be understood that it is possible to illustrate only a limited number of adaptions. Furthermore, it is to be understood that these examples are purely illustrative and that it is not applicants' intention to limit their invention to the specific conditions therein specified.

In the following examples the term "high temperature insoluble type rubber hydrochloride" is used to designate the insoluble type addition product of rubber and hydrogen chloride obtainable by reacting solid or undissolved rubber to substantial completion with hydrogen chloride at above 30° C. temperature, preferably above 90° C., as for example 130° C., and characterized by a resistance to benzol such that extraction with hot benzol at 78° C. for one hour leaves over 10% residue, and preferably over 40% residue.

*Example I*

| | Parts |
|---|---|
| High temperature insoluble type rubber hydrochloride | 100 |
| Opal wax | 10 |
| Magnesium oxide | 15 |
| Hexamethylene tetramine | 2 |
| Cumarone resin (Cumar) | 5 |

The materials were fluxed on hot differential rolls and sheeted out in sheets of about .001" in thickness. These sheets are useful as a moistureproof, non-inflammable packaging material, or insulating material. They also may be used as laminating material. The material is transparent, tough, flexible, moisture-vaporproof and highly resistant to water, acids, alkalis, alcohol, gasoline, lubricating oils and cleaning fluids such as benzol and carbon tetrachloride. The incorporation of basic stabilizers such as magnesium oxide, calcium oxide, calcium stearate, lead oxide, barium hydroxide and hexamethylene tetramine give increased heat stability to the product, while the use of hexamethylene tetramine, heptaldeoxime, give resistance to photochemical disintegration. Cumar resins, dibutyl phthalate, butyl stearate, hydrogenated ethyl abietate and chlorinated paraffin act as plasticizers and give increased flexibility. Opal wax (a diol of melting point of approximately 77 to 81° C.) acts as a homogenizing agent and thermoplasticizer during milling and also gives improved sheen and slip to the surface of the sheet as well as increasing the flexibility. Where transparency is not required, as in table cloths, washable window shades, flooring etc. large amounts of fillers and pigments may be incorporated by milling. For example 100 parts of titanium dioxide to 100 parts of the high temperature insoluble type rubber hydrochloride may be milled together with a basic heat stabilizer and sheeted out by hot calendering so as to produce a flexible sheet having a high gloss surface. Various fillers may be used such as wood flour, calcium sulphate, blanc fixe, ground cork, whiting, carbon black, clay, silica, fibers of asbestos, cotton etc. according to the use of the product.

*Example II*

Laminated products may be produced by superposing sheets such as described in Example I on wood, fabric, paper, cardboard, felt, rubber etc. and subjecting the assembly to heat and pressure. The products may be flexible or rigid according to the nature of the base material and number of plies. Several layers of duck cloth and high temperature rubber hydrochloride may be built up into a hard, strong boardlike material which may be machined. It may be made into gears or various shaped articles of manufacture, or used for panels. Also a sheet of high temperature rubber hydrochloride may be hot pressed on to, for example, a single sheet of cloth such as broadcloth, cheesecloth, silk to obtain a strong, flexible sheet suitable for table cloths, washable window shades, and the like. The high temperature rubber hydrochloride may also be laminated to one or both sides of cheap, coarse cloth such as burlap. These laminated sheets may be made into strong, heat sealable bags which are moistureproof, oil resistant, and resistant to benzol-gasoline mixtures; or the sheets with the burlap or other fibrous backing may be used as a floor covering or a wall covering. It is, of course, preferable that when the high temperature rubber hydrochloride is so used that it should contain fillers such as cork dust or asbestos. These laminated fabric products may be cut, bent, nailed and treated in the usual way as a floor covering material. In addition to high resistance to acids, alkalis, oils and gasoline the products possess good wearing qualities.

The high temperature rubber hydrogen chloride reaction product may also be laminated to other flexible backings such as rubber. For this purpose the rubber hydrochloride should contain plasticizers, one of the best for this purpose being cumarone-indene resin.

The rubber hydrochloride may be laminated on a paper surface. Over printed matter it serves as a flexible, moisture-proof, acid, alkali, oil, alcohol and ozone resistant coating suitable for the protection of valuable documents.

A high gloss surface may be produced by using a calender or plate having a highly polished surface. Such a surface is particularly valuable on paper carrying advertising matter. The high temperature insoluble type rubber hydrogen chloride reaction product is particularly desirable due to its greater solvent resistance, and greater inherent flexibility.

The rubber hydrochloride may also be laminated on wood, metal, hard rubber, glass and other rigid bodies. In veneer work the high temperature insoluble rubber hydrogen chloride reaction product can be used to form composite articles which show little or no tendency to warp. For example, a layer of veneer secured to a surface with a high temperature rubber hydrochloride molded integrally therewith is unaffected by all common liquids such as water, alcohol, gasoline, acetone, lubricating oil, soap solutions, cleaning fluids and the like. The rubber hydrochloride sheets are particularly adaptable to be directly bonded by heat and pressure to porous absorbent materials on which the application of lacquers would be impractical due to the high absorption. Fibre board, cardboard, pressed wood powder, gypsum board, plywood and the like can be given a high gloss protective surface by laminating a sheet of rubber hydrochloride on to the surface of the material by means of heat and pressure sufficient to flow the rubber hydrochloride.

In all cases where rubber hydrochloride is secured to a surface it is preferred to bond the rubber hydrochloride directly to the surface by superposing a sheet of rubber hydrochloride on the other material and subjecting the assembly to heat and pressure so that the solid rubber hydrochloride is flowed into the surface pores of the material, thereby producing a strong integral bond without the necessity for the application of extra adhesives. However, adhesives of various types may be used, and also resins such as rosin, cumar, and the like may be incorporated with the rubber hydrochloride to improve its adhesion.

*Example III*

| Compositions consisting of— | Flexible type | Rigid type |
|---|---|---|
| High temperature, insoluble type rubber hydrochloride | 50 | 100 |
| Ground barytes | 30 | 90 |
| Rottenstone | 20 | 90 |
| Opal wax | 2 | |
| Shellac | | 5 |
| Magnesium oxide | 8 | 8 |
| Hexamethylene tetramine | 1 | 1 | were prepared by the usual milling operation. The compositions are suitable for molding various articles, particularly phonograph records, both of the rigid and flexible type. The compositions may be used to form phonograph records directly, or they may be formed by molding the composition over a flexible cellulose or similar sheet. The formation of these flexible records may be done by applying a calendered sheet of the above composition or powder of the above composition on the flexible base, and hot pressing to obtain a homogeneous integrally bonded surface. Rigid records formed from rubber hydrochloride may be produced in thickness down to approximately .02" and are characterized by unusual toughness and mechanical strength, as well as moisture-proofness and high resistance to oils and ordinary solvents. Records may also be made from compositions in which cotton flock is used as a filler. For some purposes fillers may be eliminated and record made of straight rubber hydrochloride containing about 2% of a basic stabilizer such as magnesium oxide.

*Example IV*

An example of a floor covering material is as follows:

| | Parts |
|---|---|
| High temperature, insoluble type rubber hydrochloride | 100 |
| Barytes or blanc fixe | 200 |
| Magnesium oxide | 15 |

The materials were thoroughly mixed by fluxing on heated differential rolls and formed into sheets. The sheets were molded into tiles and cemented to a surface to form a flooring of good wearing qualities. The tiles may also be used for walls etc. Other fillers such as wood flour, cork dust, whiting, titanium dioxide, asbestos fibers may be used in place of blanc fixe.

*Example V*

| | Parts |
|---|---|
| High temperature, insoluble type rubber hydrochloride | 100 |
| Hydrogenated ethyl abietate | 40 |
| Ground cork | 140 |
| Barytes | 70 |
| Magnesium oxide | 15 |
| Hexamethylene tetramine | 2 |

The materials were thoroughly mixed by fluxing on differential rolls and then formed into sheets. The sheets were then molded over burlap to form a linoleumlike product which possessed excellent wearing qualities.

*Example VI*

A compound which consisted of:

| | Parts |
|---|---|
| High temperature, insoluble type rubber hydrochloride | 100 |
| Magnesium oxide | 10 |
| Lead oxide | 10 |
| Sulfur | 7 |
| Butyr-aldehyde aniline | 5 |
| Opal wax | 5 | was prepared by the usual milling operation and calendered in a thin sheet on the surface of broadcloth in such a manner that the rubber hydrochloride composition adhered to the cloth. The cloth was then heated for one hour at 300° F. At the end of this time the sheet of material resembled well vulcanized rubber and was strong, elastic and oil resistant. Other fabric backing such as felt, duck, cheese cloth may be used.

The product is well adapted for use as a printer's blanket.

Example VII

A compound which consisted of:

| | |
|---|---|
| High temperature, insoluble type rubber hydrochloride | 100 |
| Magnesium oxide | 15 |
| Litharge | 20 |
| Whiting (cliffstone) | 140 |
| Opal wax | 5 |
| Cumar | 5 |
| Hexamethylene tetramine | 1 |
| Sulfur | 7 |
| Butyr-aldehyde-aniline | 5 | was prepared by the usual milling operation.

This compound was forced through a tubing machine to form the insulation for, for example #16 gauge copper wire. The insulated wire was coiled in circular pans and buried in soapstone in the manner usually employed with wire insulated with natural rubber. The pan containing the soapstone and insulated wire was then heated in open steam at 300° F. for one hour. The resulting product resembled insulated wire prepared with natural rubber. Where high elasticity and resilience is not required the vulcanizing ingredients may be eliminated and the long cure replaced by a quick molding operation. When this is done the amount of plasticizer, which preferably should be an oil resistant plasticizer such as opal wax, should be increased.

Example VIII

A gasket was prepared from the following compound:

| | |
|---|---|
| High temperature, insoluble type rubber hydrochloride | 100 |
| Thermatomic carbon | 40 |
| Magnesium oxide | 10 |
| Litharge | 25 |
| Opal wax | 5 |
| Hexamethylene tetramine | 2 |
| Sulfur | 7 |
| Butyraldehyde-aniline | 5 |

This compound was fluxed into a homogeneous mixture on differential rolls and then placed in a hot mold and pressed into the form of a ring. The mold and compound were then heated at 298° F. for fifty minutes. At the end of this time the gasket was removed from the mold and found to be well vulcanized. Where high elasticity and resilience is not required the sulfur and accelerator may be left out and the composition molded for 10 minutes at 270° F. The opal wax which acts as an oil resistant plasticizer should preferably be increased to 10% or more.

Example IX

A hose was constructed from the following compounds and illustrates the use of a combination of natural rubber and high temperature rubber hydrochloride:

Hose tube

| | |
|---|---|
| High temperature, insoluble type rubber hydrochloride | 100 |
| Maganesium oxide | 10 |
| Lead oxide (PbO) | 25 |
| Opal wax | 10 |
| Hexamethylene tetramine | 2 |
| Sulfur | 7 |
| Butyr-aldehyde aniline | 5 |
| Gastex | 40 |
| Thermax | 40 |

Friction and cover stock

| | |
|---|---|
| Smoked sheets | 100 |
| ZnO | 5 |
| Stearic Acid | 3 |
| Sulfur | 3 |
| Mercapto benzothiazole | .75 |

A one inch hose was constructed by first covering a mandrel with the hose tube stock which had been calendered into a sheet. Two layers of fabric coated with friction and cover stock were next applied. This was followed by a layer of friction and cover stock which had been calendered into a thin sheet. The hose was then wrapped with a moist cloth and vulcanized in open steam at 290° F. for one hour. At the end of this time the hose was removed and found to be well cured.

From the above examples it will be apparent that the number of uses for high temperature rubber hydrochloride is so great that it is impossible to attempt to enumerate them all here. By increasing the amount of sulfur to viz. 30 parts per 100 parts of the rubber hydrochloride, a product resembling hard rubber may be obtained, which, however, is much superior to hard rubber in oil resistance, and of lighter coloration than hard rubber. The products obtained with high temperature unvulcanized rubber hydrochloride in resistance to benzol and in toughness and flexibility, and in general these advantages hold for the vulcanized products obtained from the respective unvulcanized rubber hydrochlorides. The rubber hydrochlorides may be compounded with polymerized chloroprene, thiokol and, in general, with materials which may be used for compounding natural rubber although zinc oxide and other zinc compounds of amphoteric metals should be avoided since they tend to cause decomposition and cyclization. Among the uses for the rubber hydrochlorides, and particularly the high temperature rubber hydrochloride addition products are printers' rolls, printers' blankets, platens, battery boxes, floorings, artificial leather, golf ball covers, hose tubings, sheets and gaskets, packing, stoppers, dielectrics, insulators, panels, table tops and wall boards. Due to the dielectric strength and ozone resistance the product is particularly adaptable for electric uses as in ozonizers, condensers, radios, telephones etc.

As many apparent and widely different embodiments of this invention may be made without departing from the spirit thereof, it is to be understood that we do not limit ourselves to the foregoing examples or descriptions except as may be necessitated by the prior art, and as indicated in the following claims. It is also to be understood that on the examples other types of rubber hydrochlorides may be used, but in general with less satisfactory results because other types of rubber hydrochloride are not as resistant to solvents or as flexible, and in many cases have other disadvantages over the high temperature insoluble type rubber hydrochloride of this invention.

We claim:

1. In the process of producing solvent, oil and water resistant rubber hydrochloride composition from solid rubber and gaseous hydrogen chloride, the step of maintaining the temperature of the mass throughout the major part of reaction at above 90° C. and below the temperature at which substantial decomposition of the rubber hydrochloride takes place.

2. In the process of producing solvent, oil and water resistant rubber hydrochloride composition from solid rubber and gaseous hydrogen chloride, the step of maintaining the temperature throughout the major part of the reaction at between 90° C and 140° C.

3. The process of making a solvent, oil and water resistant rubber hydrochloride composition which comprises reacting solid rubber with substantially dry gaseous hydrogen chloride under a pressure of above approximately 50 pounds per sq. in. at a temperature between approximately 90° C. and 140° C. for a time sufficient to produce a substantially saturated product.

4. The process of making a solvent, oil and water resistant rubber hydrochloride composition which comprises reacting solid rubber with hydrogen chloride to substantial completion under superatmospheric pressure at a temperature above 90° C. but below the decomposition temperature of the substantially saturated product.

5. The process of making a solvent, oil and water resistant rubber hydrochloride composition which comprises reacting solid rubber with hydrogen chloride at a temperature of approximately 120° C.

6. The process of making a solvent, oil and water resistant composition of a hydrogen chloride addition product of rubber, which comprises subjecting a solid mass of rubber to hydrogen chloride at a pressure and for a length of time sufficient to substantially saturate the double bonds of the rubber mass substantially throughout its mass and controlling the temperature for a major part of the reaction at a temperature between approximately 90° C. and 140° C. and maintaining the pressure and the temperature such as to prevent substantial decomposition of the addition product.

7. The product obtained in accordance with the process defined in claim 1, said product being characterized by high insolubility in boiling benzol, low swelling characteristics and further characterized by flexibility, toughness, high flow point, and a sharply defined crystalline X-ray pattern.

8. An addition product of rubber and hydrogen chloride having a chlorine content of between approximately 31 and 34%, and characterized by a resistance to solvents such that more than 10% of undissolved matter will remain on heating with benzol at 78° C. for one hour, and further characterized by a resistance to swelling such that its volume increase in 80—20 gasoline benzol mixtures for 48 hours and 4 hours after removal is less than 1%.

HERBERT A. WINKELMANN.
EUGENE W. MOFFETT.
WILLIAM C. CALVERT.